Jan. 31, 1956  E. H. W. WEIBULL  2,733,016
WIRE RECORDER

Filed Nov. 7, 1952

Fig. 1.

INVENTOR.
ERNST HJALMAR WALODDI WEIBULL
BY
Frederick E. Hary
ATTORNEY.

Jan. 31, 1956   E. H. W. WEIBULL   2,733,016
WIRE RECORDER
Filed Nov. 7, 1952   4 Sheets-Sheet 2
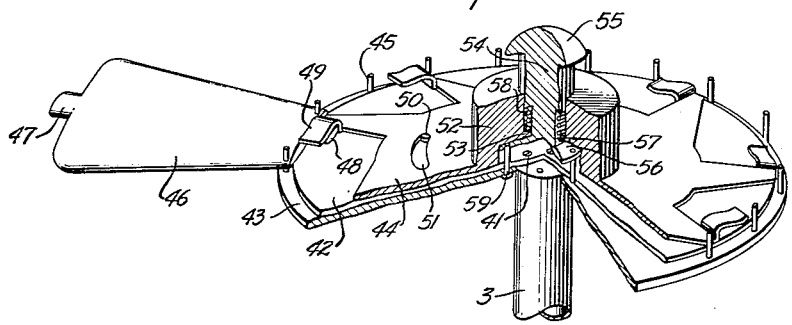
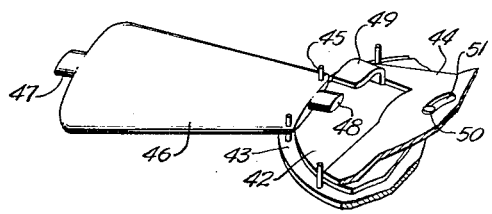  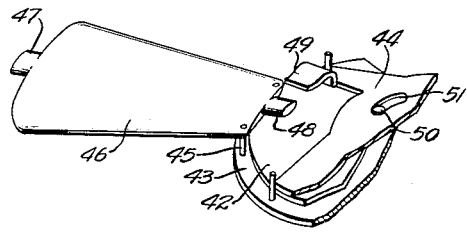
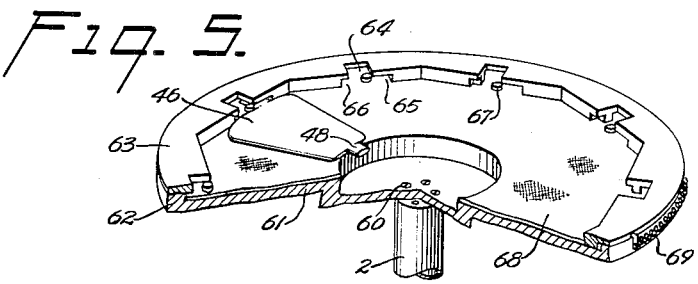
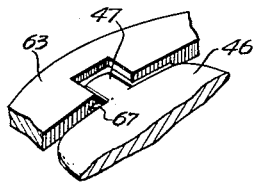  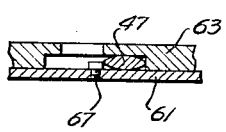  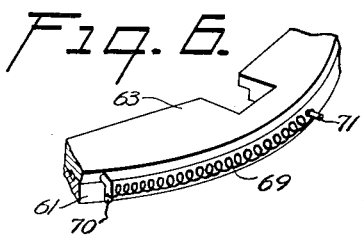
INVENTOR.
ERNST HJALMAR WALODDI WEIBULL
BY
ATTORNEY.

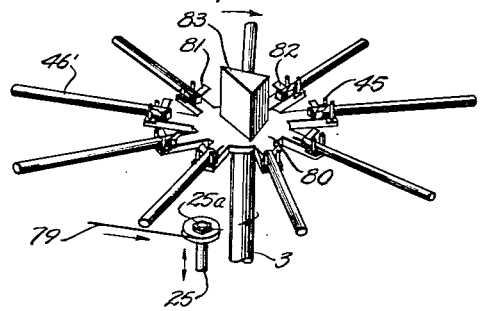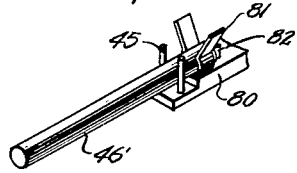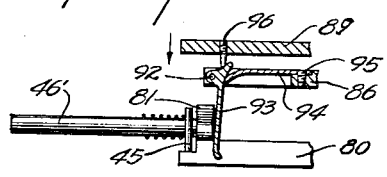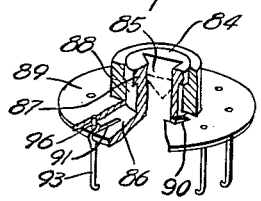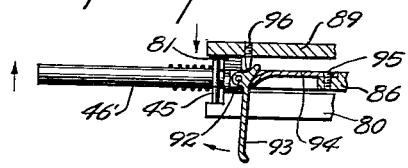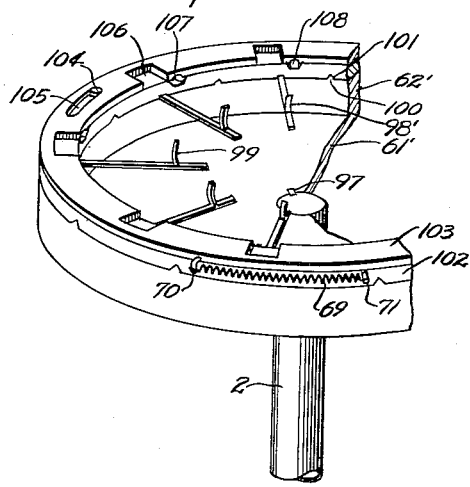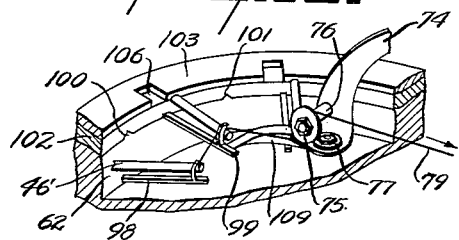

Jan. 31, 1956     E. H. W. WEIBULL     2,733,016
WIRE RECORDER

Filed Nov. 7, 1952     4 Sheets-Sheet 4

INVENTOR.
ERNST HJALMAR WALODDI WEIBULL
BY
ATTORNEY.

United States Patent Office 2,733,016
Patented Jan. 31, 1956

2,733,016

WIRE RECORDER

Ernst Hjalmar Waloddi Weibull, Brosarp, Sweden

Application November 7, 1952, Serial No. 319,265

Claims priority, application Sweden November 7, 1951

16 Claims. (Cl. 242—54)

The present invention relates to wire recorders, more particularly wire recorders in which the recording wire can be transferred from one magazine to another magazine.

Conventional wire recorders, as hitherto known, generally comprise three shafts perpendicularly mounted relative to the plane of a baseplate. Two of these shafts are rotatably supported on the plate and are coupled with suitable driving means. Each of the ends of these two shafts protruding from the plate supports a reel. On one of the two reels the recording wire is wound in such a manner that upon rotation of the shafts one reel will function as feeder reel and the other as wind-up reel. The third shaft is also mounted on the plate but is axially movable relative thereto. One end of the third shaft, usually the one situated beneath the baseplate, is coupled with a cam member effecting a reciprocatory movement of the shaft. The other end of the shaft supports the electromagnetic sound head through which the recording wire is guided, when moving from one reel to the other. The sound head is connected generally through an amplifier with a loud speaker or a microphone, as the case may be.

Each reel is generally in form of a cylinder having a peripheral groove of rectangular cross-section. The reels are usually made of metal and have an axial bore, by means of which they are fitted upon the corresponding driving shaft.

The recorded wire after being wound upon reels of the aforementioned type may be stored in boxes or cases. Storage of cylindrical reels occupies more space and is generally more cumbersome than for instance the filing of record discs. A cylindrical reel is particularly inconvenient when shipping of the reel through the mail is required.

It is also difficult safely to fasten the ends of the wire wound upon a reel. The usual procedure is to attach the inner end of the wire to the bottom of the groove in the reel and the end of the outermost layer of the wound-up wire for instance by means of Scotch tape. This procedure is not very satisfactory or reliable and also requires a certain dexterity.

As is well known, the wire when traveling between the two reels sometimes breaks. As the wire has an inherent springiness it tends to become tangled. As a result, it may be necessary to remove sections of the wire which may entail an irreplaceable loss of records. Furthermore, it is always time-consuming to restore the wire recorder to working condition.

Another disadvantage of conventional wire recorders is that the wire is wound upon its respective reel as the recording of intelligence progresses. Consequently, the recorded intelligence appears on the part of the wire that is situated at or near the center of the reel, so that the intelligence can not be reproduced without rewinding of the wire which is time-absorbing and inconvenient.

It is well known that an entirely satisfactory winding of a thin and somewhat springy wire on a reel requires that the guiding device which guides the wire during the winding operation is a very accurate one so that each layer of wire has exactly the same width as the groove in the reel since otherwise difficulties are encountered when the wire is unwound. Precision made guiding devices are very expensive in comparison with the other components of a wire recorder. Also a precision device is inherently rather delicate. Attempts have been made to employ a less precise, inexpensive but sturdier wire guide, but such attempts were not very successful in practice.

One of the objects of the present invention is a wire recorder which permits the transfer of a recording wire from one magazine to another in a simple and convenient manner, which provides for an easy and reliable attachment of the outer ends of the wires; which avoids the difficulties arising with conventional wire recorders when a wire breaks, and which finally do not require a delicate high precision wire guide but are capable of reliably operating with a much simpler and sturdier guide.

Another object of the invention is to provide a wire recorder which permits an immediate reproduction of the recorded intelligence without rewinding of the wire.

According to the invention, the aforementioned objects, features and advantages of the invention and other objects, features and advantages which will be pointed out hereinafter are attained by winding layers of recording wire in planes which are substantially perpendicular to the axis of the rotary shaft of a wire magazine, the wire turns in each layer being of a configuration such that each wire forms an angle with the wire in the next preceding turn and the wire in the next succeeding turn, the intersections of the wires in one layer being spaced by equal or approximately equal intervals.

In the accompanying drawing several now preferred embodiments of the invention are shown by way of illustration and not by way of limitation.

In the drawing:

Fig. 1 is a diagrammatic perspective view of a wire recorder set recording to the invention.

Fig. 2 is a perspective view, partly in section, of one of the wire magazines of the recorder.

Figs. 3 and 4 are detail views of the magazine of Fig. 2, showing components of this magazine in different positions.

Fig 5 is a perspective view, partly in section, of the second wire magazine of the wire recorder set of Fig. 1.

Fig. 6, 7 and 8 are detail views of Fig. 5 showing components of the magazine of Fig. 5 in different positions on an enlarged scale.

Fig. 9 is a perspective view of a modification of the wire magazine of Fig. 2, showing one part of the modified wire magazine.

Fig. 10 is a detail view of a component of Fig 9 on an enlarged scale.

Fig. 11 is a perspective view, partly in section, of the other part of the wire magazine of Fig. 9, Fig. 11 showing a device for lifting the wound-up wire.

Figs. 12, 13 and 14 are detailed views, partly in section, showing the coaction of the parts of the wire magazine as illustrated in Figs. 9 and 10 on an enlarged scale.

Fig. 15 is a perspective view, partly in section, of a modification of the wire magazine of Fig. 5.

Fig. 16 is a fragmentary view showing part of the wire magazine of Fig. 15 and of additional components coacting therewith.

Figure 17:
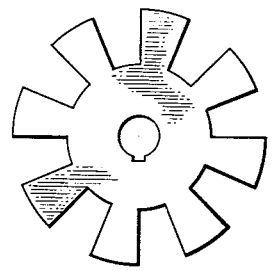
Figs. 17 and 18 are plan views of additional modifications of wire magazines.

Referring first to Fig. 1, the wire recorder according to this figure comprises a base plate rotatably supporting two shafts 2 and 3 in an appropriate manner not shown. The lower end shaft 2 of a shaft mounts a sheave 5 fixed by a wedge 4 and shaft 3 mounts a sheave 7 fixed by a wedge 8. An endless belt 6 joins the two sheaves. The lower end of shaft 3 mounts a bevel gear 9 secured by a wedge 10. This gear is in mesh with another bevel gear 11 fixed on the shaft 12 of an electrical motor 13. A conductor 14 connects the motor with a unit 15 which is connected in a manner not shown with a power source also not shown. The unit comprises an electrical switch having a lever 16 for manual operation and a knob 17 for regulating the speed and the rotational direction of the motor. Shaft 3 further supports a gear 19 fixed by means of a wedge 18. The gear is in mesh with a gear 20 fixed upon a shaft 21 journalled, in a manner not shown, in bearings. The upper side of gear 20 supports a ring-shaped cam surface 23 coacting with a wheel 24. This wheel is rotatably supported on one end of a shaft 25 which in turn is supported by plate 1 in such a way that shaft 25 is rotatable and axially displaceable. Directly above the end of shaft 25 supporting wheel 24 one end of a bar 26 is mounted in such a way that the bar is pivotal about a pin perpendicular to the longitudinal axis of the shaft 25. The other end of bar 26 is pivoted to a pin 27 supported on a lug 28 extending from and secured to plate 1. A coil spring 29 is fitted about shaft 25 between the bottom side of plate 1 and bar 26. The upper end of shaft 25 rotatably supports a pulley 25a. As a result of the manner in which the bar 26 is supported by shaft 25, the plane of the diameter of wheel 24 will always be perpendicular to the radius of the ring 23. Plate 1 further supports a bar 30 in such a manner that the bar is rotatable and displaceable in an axial direction. The lowermost end of bar 30 is pivoted to bar 26, and the uppermost end of the bar supports a sound head 31 which may be in form of an electromagnetic device. The sound head is connected by wires 33 with a unit 32 which, in turn, is connected by wires 35 to a microphone 34 and by wires 37 to a loud speaker 36. The components 32, 34 and 36 may be of a kind commonly used in commercial wire recorders. Thus, unit 32, when recordings are made, amplifies a signal representing sounds picked up by microphone 34. The unit 32 also heterodynes this basic signal with a heterodyne signal. When reproductions are made, the unit removes the heterodyne signal and amplifies or attenuates the basic signal, as desired, thereby transmitting to the loud speaker 36 the basic signal for converting the same to sound. The unit 32 is provided with an on and off switch 38, a knob 39 for setting the unit for recording or reproducing, and a knob 40 for setting the amplification.

At the uppermost end of the shaft 3 the hub of a wire magazine is mounted by means of the screws 41. This wire magazine will hereinafter be referred to as the right wire magazine. The hub and the shaft may also be connected with each other by means of wedges or keys or similar devices which prevent a relative rotation of the hub and the shaft and have the advantage that the shaft and the hub can be more easily disassembled. The hub which is best shown in Fig. 2 comprises a circular disc 42 secured by screws 41 to shaft 3. Two discs 43 and 44 are arranged on opposite sides of disc 42, disc 43 having a larger diameter than disc 42 so that the peripheral margin of disc 43 protrudes beyond disc 42. The protruding margin of disc 43 has thereon a plurality of pairs of perpendicular pins 45 circumferentially spaced by selected intervals. On each pair of pins, a plate-shaped spoke 46 is threaded, as can best be seen on Fig. 2 which also shows that each pair of pins is passed through two holes in the plate. As a result, a slot of a constant width is formed between each two plates. In some cases it is preferable to employ plates of such shape that the width of each slot gradually increases from an intermediate point of the slot toward the outer end of the slot. Each of the plates 46 is provided at both ends with radially extending lugs 47 and 48 respectively. Lug 48 of each plate 46 abuts against the upper side of the disc 42 by means of peripheral recesses provided for this purpose in disc 44. In each recess, a lug 49 is left forming part of disc 44. Each lug is so bent that it can be snapped over a corresponding lug 48 for holding the same in springy engagement with disc 42. This disc has thereon a pin 50 which protrudes through an arc-shaped groove 51 in disc 44. The pin and groove arrangement permits the two discs 42 and 44 to rotate relative to each other about a common axis and through a distance corresponding to the length of the groove which is so selected that lugs 48 and lugs 49 can be engaged with and disengaged from each other. A cylindrical body 52 is secured to disc 44 or integral therewith. The cylinder has an axial center bore therethrough. The upper part of the bore has a smaller diameter than the lower part, and a ring shoulder 53 is formed between the two bore parts of different diameter. A cylindrical body 54 is fitted in the bore of body 52. The upper end of body 54 ends in a knob 55 and the lower end in a circular disc with a collar 56 engaging the ring shoulder 53. The collar has a diameter which is nearly equal to the larger diameter of the bore. Cylinder 54 is formed with a peripheral groove 57 one wall of which is defined by collar 56. The shoulder 53 is nearly in contact with the bottom of the groove. A coil spring 58 is fitted in the groove and in contact with both the upper wall of the groove and with the said shoulder. The upper ends of a number of pins 59 are secured to collar 56, each pin being passed through a hole made in disc 42. The lower end of each pin is secured to disc 43.

The upper end of shaft 2 mounts a second wire magazine by means of screws 60, as can best be seen on Fig. 5. This wire magazine will hereinafter be sometimes referred to as the left wire magazine. Instead of by means of screws, the wire magazine can be held on shaft 2 by means of wedges or keys or similar devices such that the magazine and the shaft cannot rotate relative to each other.

The left wire magazine comprises a circular disc 61, which has in its center a cylindrical counterbore.

The upper surface of the disc is raised to form a peripheral rib 62 of rectangular cross-section and supports a ring 63 having the same outer diameter as disc 61. The upper surface of the ring is parallel to the upper surface of the disc 61 and the ring has a peripheral groove engaging the upper surface and the inner wall of rib 62. The bottom surface of ring 63 which is also parallel to the surface of the disc 61 and abuts against it, is formed with a plurality of radial grooves 65 of rectangular cross-section. The bottom groove 65 is removed so that radial notches or recesses 64 are formed and that to the left of each recess 64 (as seen on Fig. 5) a groove portion 66 is left which is large enough to receive a pin 67. These pins are fastened to the disc 61 and so disposed that each pin is located in one of a respective said grooves 65.

The disc is preferably covered with felt 68 for preventing damaging of wire which may come in contact with disc 61.

One end of a spiral spring 69 is fastened to ring 63, the other end of the spring being secured to disc 61. Spring 69 is biased to turn ring 63 relative to disc 61 in such a direction that the pin 67 will come into contact with the right hand wall of the respective groove 65 (as seen in Fig. 5). Fig. 6 shows more clearly how the spiral spring is fastened to the ring and the disc. As will be observed, the spring extends along the periphery of disc 61 by being secured to the ring 63 by a bent pin 70 and to the disc 61 by a straight pin 71. Fig. 5 also shows a plate-shaped spoke 46 provided with two lugs 47 and 48 at the ends of the plate. The lug 47 of the disc is held between the pin 67 and the right hand wall of the respective groove 64, 65.

Plate 1 further supports clamps or brackets 72 for a horizontal pin about which one end of an arm 74 is pivoted. The brackets 72 are formed with two shoulders, not shown, for the arm 74 which coacts with the left wire magazine. The shoulders are arranged in such a manner that when the arm rests against one shoulder, it will have the position shown in the figure, and when the arm rests against the other shoulder, it will have an upwardly inclined position. The other end of arm 74 ends in a portion which is perpendicular to the disc 61 and is continued by a portion parallel to disc 61 when the arm 74 occupies the position shown in Fig. 1. The perpendicular portion of the arm supports a pulley 75 rotatable about a horizontal pin 76 and the extension portion of the arm supports a pulley 77 rotatable about a horizontal pin 78. One end of a wire 79 is wound about the plates 46 of the left magazine and then guided over pulleys 77 and 75, through sound head 31 and pulley 25a to the plates 46 of the right wire magazine.

The operation of the wire recorder, as hereinbefore described, is as follows:

Let it be assumed that the left wire magazine is loaded with wire and that the right wire magazine is without spoke plates 46. Then, disc 44 of the right magazine is turned relative to disc 42 into the limit position of Fig. 3 for instance by gripping cylinder 52 which is preferably milled for this purpose. The disc 42 will be stationary as it is secured to shaft 3, it being assumed that motor 13 is not running. Each pair of pins 45 will be situated adjacent to a respective one of the recesses in disc 44. Then a plate 46 is hooked upon each pair of pins. When now disc 44 is turned into the other limit position as determined by the pin 50 and the groove 51, the lugs 49 will snap over the lugs 48 of the plates 46 and keep the lugs 48 resting against the upper surface of the disc 42 during the movement of the disc 44. The next step is to guide the free end of the wire in the left wire magazine over the pulleys 77 and 75, through the sound head 31 and over the pulley 25a. From pulley 25a, the wire is led over the upper surface of the plate 46 nearest to the left of pulley 25a, then in the direction of the arrow across the next space between two plates 46, thereupon along the lower surface of the following plate 46, the next space, the upper surface of the following plate 46, that is the third disc to the left of the pulley 25a, and so on. As a result, the wire runs on the upper surface of every second plate 46 and on the lower surface of the intermediate plates 46. Preferably somewhat more than one turn of wire is wound about the right wire magazine. When now the motor 13 is started, the right wire magazine will rotate in the direction of the arrow. At the same time the cam ring 23 is rotated, whereby pulley 25a is moved up and down. The shape of the cam surface of ring 23 is such that the pulley moves downwardly during the passage of the space between the two plates 46 initially situated to the left and right of the pulley 25a and is in its lowermost position during the passage of the right hand plate 46. Then the pulley moves upwardly during the passage of the next following space and remains in its upward position during the passage of the next plate 46, and so on. In other words, the pulley 25a changes its position at the passage of each space. An odd number of plates 46 is preferably provided as then the wire, when one turn is wound upon the magazine, will lie on opposite sides of the plates 46 relative to the last preceding and the next following turn. In the spaces between the plates, the wire of one turn will cross the wire belonging to the preceding turn and the wire belonging to the succeeding turn. Hence, the position of the individual wire turns in radial direction is unequivocally determined by the position of the preceding wire turns. By changing the width of the space between each two plates 46 the length of the wire which can be accommodated by the magazine is varied for a given inner and outer radius $r$ and $R$ respectively of the plates 46. If the spaces are made very narrow and the slots have a constant width, the crossing points of the wire in each space will be exactly above each other. For a wire diameter $d$, $n$ turns can be accommodated between the radii $R$ and $r$. The number $n$ is determined by the equation $n=(R-r)/d$. On each side of the plates 46, the turns lie at a distance from each other equal to the wire diameter $d$, that is, the two sides of each plate are half covered with wire. If the width of the spaces is increased, the crossing points of the wire will change in relation to each other whereby a greater number of turns will be obtainable. The width of the spaces can be selected such that the two sides of the disc formed by plates 46 are fully covered with wires. The total wire length $L$ can then be calculated according to the equation $L=\pi(R^2-r^2)/d$. The thickness of the filled wire magazine over the empty magazine will increase by twice the wire diameter $2d$. If the width of the space is further increased, still more wire can be wound upon the magazine, as the wire turns will partly be placed on top of each other in an axial direction. The fully wound magazine will then have an increase in thickness greater than $2d$.

Simultaneously with the beginning of the winding of the wire upon the right wire magazine, the amplifier unit 32 is switched on by switch 38 and adjusted for recording by means of the knob 39. The intelligence to be recorded is picked up by microphone 34. When the right magazine is substantially fully wound, the end of the wire is wound by hand upon the magazine. By reason of the previously explained manner in which the wire is wound upon the right magazine, the wire cannot unwind itself and also holds the plates 46 in their proper relative positions such that the wire and the plates can be removed from the hub of the wire magazine without changes in their relative positions. For removing the wire and the plates from the hub the magazine is so turned that pin 50 abuts against the other end of groove 51. As a result, the lugs 49 become disengaged from the lugs 48 and the only connection between the discs and the hub is by the pins 45 passed through their holes in the plates 46. When now the cylindrical body 54 is pressed down against the action of spring 58, collar 56 will come into contact with disc 42 and disc 43 will loose its connection with disc 42 as it is joined to collar 56 only by pins 59. As can best be seen on Fig. 4, the extent of the downward movement of body 54 is so selected that pins 45 leave their holes in the plates 46. The wire and the plates 46 now rest loosely on the hub of the magazine and can easily be removed therefrom to be placed for instance in an envelope for filing or mailing. If desired, however, it is also possible to place the disc formed by wire and the plates in a thin ring. This ring may be designed similar to the device shown in Fig. 5, except that shaft 2 and the center part of disc 61 are omitted so that a ring is obtained the radial width of which coincides or nearly coincides with the width of ring 63. After insertion of the wire and the plates 46 in the ring 63, this ring is turned by hand relative to the remaining part of the disc 61 against the action of spring 69 until pins 67 enter the recesses 66. The lugs 47 of the plates 46 are inserted in the recess 64 thereby resting upon disc 61, as is shown in Fig. 7. When ring 63 is now released, spring 69 will turn the ring 63 in opposite direction. As a result, the grooved wall of each groove portion 65 is no longer in contact with a pin 67 but with the lug 47 of a plate 46. Hence, each lug 47 will be retained under pressure between a pin 67 and the right grooved wall of a groove portion 65 by the spring 69, as is clearly shown in Fig. 8 which also shows that the bottom of the groove portion 65 covers lug 47. If it be desired to remove the wire with the plates 46 from the ring, the ring 63 is turned back into the position which it occupied when the wire and the plates were placed in the ring.

When the recorded wire wound upon the right wire magazine is to be reproduced immediately, the wire with magazine is placed on the left wire magazine which has spoke plates for this purpose. In order to insert the wire with the plates, the arm 74 of Fig. 1 is turned into its uppermost position and the ring 63 is rotated as above described. When the wire with the plates is inserted, the lugs 47 will rest against the disc 61 and be retained as described above. After the insertion, arm 74 is moved into the position as shown in Fig. 1. The right wire magazine is fitted with empty plates 46. The inner end of the wire now loaded in the left wire magazine is led, as previously described, to the right wire magazine. When motor 13 is now started, the two wire magazines will rotate. As a result, the left wire magazine will be unwound from the center and the right wire magazine wound as previously described. If knob 39 of unit 32 is set for reproduction, the recorded intelligence can be heard through loud speaker 36. Hence, listening is possible directly after the recording and without rewinding. The mounting of the sound head on bar 26 permits the sound head to follow vertical movements of the wire so that the sound head remains stationarily relative to the wire in a vertical direction.

Figs. 9 to 16 show a modification of the right and left wire magazines. The wire magazines according to these figures differ from the previously described magazines by having spokes in form of pins which entails a change in the design of the hub and the outer holding means for the spokes. Furthermore, arm 74 has a slightly different configuration. Parts that are identical with parts in the foregoing figures are given the same reference numbers and parts that are similar, the same reference numbers though primed.

Fig. 9 shows one part of the right wire magazine. This part comprises a plate 80 which may be secured to shaft 3 in the same manner as the wire magazine of Fig. 2 and supports pairs of pins 45. Behind each pair of pins 45, a substantially U-shaped clamping spring 81 is fastened to plate 80 and behind each clamping spring, an abutment lug 82 the forward surface of which is parallel to a plane laid through the pins in front of it. The lugs may be formed by pressing a flap out of plate 80. A spoke 46' is fitted between each pair of pins and snapped in the respective clamping spring with one end of the spoke abutting against the respective lug 82, as can best be seen on Fig. 10. A triangular post 83 is secured to the center of plate 80. By means of this post, one part of the wire magazine can be joined to a second part of the wire magazine which forms a lifting member and is best shown in Fig. 11. The said second part comprises a cylindrical body 84 having a hole 85 therethrough shaped to fit said post 83. Cylinder 84 has at its ends two collars 86 and 87 which may either be secured to the body or be integral therewith. A cylindrical ring 88 is rotatably fitted upon cylinder 84. The inner surface of ring 88 rests against the collar 87 and the wall of cylinder 84. Between ring 88 and collar 86 there is fitted a disc 89 with a center hole for passage of cylinder 84. Disc 89 and collar 86 are joined to each other by guide pins (not shown) preventing a relative movement between collar 86 and disc 89. On disc 89 and below the lower end of the ring 88 a wedge-shaped member 90 is arranged which fits in a corresponding recess in the lower end of ring 88.

Collar 86 can accommodate as many spokes 46' as there are peripheral radial recesses 91. In the outer end of each recess 91 a two-arm lever 93 is pivotally supported on a pin 92, as can best be seen in Figs. 12 to 14. In the inner end of each recess, one end of a leaf spring 94 is fastened by a screw 95, the other free end of the leaf spring cooperating with the respective lever 93. Each lever 93 also cooperates with a screw pin 96 depending from disc 89.

Fig. 15 shows the left wire magazine without spokes. The magazine comprises a disc 61' similar to the one described in connection with Fig. 5 and mounted on shaft 2 by means of keys 97. Instead of keys for fastening the disc 61' to the shaft 2, fastening means similar to those shown in Fig. 5 may be used. A ring flange 62' protruding from disc 61' has a plurality of radial guiding ribs 100 fitting grooves 101 in a ring laid upon flange 62'. The grooved ring comprises two parts 102 and 103 rotatable relative to each other. The extent of the relative rotation is limited by a pin 104 on ring part 102 and engaging a curved groove 105 in ring part 103. Ring part 103 is formed with a plurality of radial recesses 106 corresponding to the number of spokes and ring part 102 with a corresponding number of radial grooves 107. Above each groove 107 in ring part 102 a groove 108 in ring part 103 is situated when the ring parts occupy relative positions as shown in Fig. 15. The two ring parts are joined at their peripheries by a spring 69. At the bottom of ring part 102, there are fastened a plurality of springy radially oriented support members 98 each of which, near its free end, has a hook-shaped nose 99 substantially perpendicular to the respective member 98.

Fig. 16 shows the left wire magazine fitted with spokes forced into grooves 107 between the ring parts 102 and 103. This figure also shows the free end of arm 74, the part of which parallel to disc 61' has an extension 109 cooperating with noses 99.

A wire recorder with wire magazines according to Figs. 9 to 16 operates in the same manner as the wire recorder equipped with wire magazines of Figs. 2 to 8 except that the transfer of fully wound spokes from the right wire magazine to the left wire magazine or to a storage receptacle is different and that parts 98 and 109 are added.

When the right wire magazine is fully wound, the lifting member of Fig. 11 is joined to the device of Fig. 9 by fitting post 83 in hole 85. The wedge 90 then engages the recess in ring 88. In this position disc 89 is in contact with the wider part of ring 88 and at a certain distance from collar 86, as shown on Figs. 12 and 13. The relative position of post 83 and hole 85 are adjusted such that each lever 93 will be juxtaposed to a spoke 46'. Collar 86 is then moved into contact with plate 80 whereby the ends of the clamping springs 81 will abut against the bottom of disc 89, as is shown in Fig. 13. When now in this position of the parts ring 88 is turned in such direction that key 90 leaves its recess, disc 89 approaches collar 86, whereby the legs of clamping springs 81 are spread and lose their gripping power. Furthermore, when the disc 89 and the collar 86 approach one or the other, each pin 96 will pivot one arm of the corresponding two-arm lever 93 in such direction that the other arm of the lever will be turned into engagement with the wire wound upon the spokes. The wire with the spokes can now easily be removed from plate 80 and be placed in the ring composed of parts 102 and 103. However, before placing the wire-spoked assembly in the ring, the ring parts must be turned against the action of the spring 69 through such an angle that the recesses 106 are juxtaposed to grooves 107. When the outer ends of the spokes have been placed in the grooves, the ring parts are returned to their original positions so that the grooves 108 overlie the spokes. As the hooked springy members 98 prevent a slipping of the wound wire from the spokes, they can now be released from the lifting member of Fig. 11. For this purpose, the ring 88 is returned to its original position, that is, the position in which key 90 is in its recess. Each leaf spring 94 then moves the corresponding lever 93 back to its original position which is the one shown on Figs. 12 and 13. The ring with the wire and spokes assembly is now ready to be placed in a storage receptacle, such as a bag or on the disc 61' for reproducing the wound-up wire. In case unwinding from the inside is desired, the springy members 98 must be bent aside by means of extension arm 109.

Figure 18:
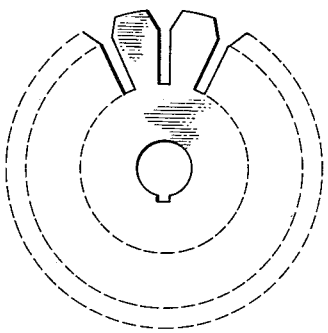

The wire magazines, as hereinbefore described, are designed for unwinding from the inside, to avoid tedious rewinding between recording and reproducing. In some instances, the time-saving feature of avoiding rewinding may not be necessary while all the other advantages of wire magazines according to the invention are still wanted, in such event simple plane discs may be used instead of spokes. Such discs are shown in Figs. 17 and 18 and have preferably a circular form and a plurality of radial recesses, the circumferential width of which increases toward the periphery. Each disc has a center hole for fitting the disc upon shaft 2 or 3. The discs may be secured on a shaft by means of a screw, nut or the like. The two shafts 2 and 3 are fitted with identical discs. When discs according to Figs. 17 and 18 are used, the arm 74 will not be needed but a shaft with a pulley such as shaft 25 with pulley 25a and a cam surface such as cam surface 23 are required. These parts are controlled by shaft 2 in the same manner as parts 25, 25a and 23 are controlled by shaft 2. The discs will thus be wound with wire in the same manner as the spokes of the previously described wire magazines.

The previously described wire magazines are loaded by laying the wire on the upper surface of each second spoke and on the bottom surface of intermediate spokes. Obviously the wire can also be laid on the upper surface of each third spoke and on the bottom surface of the two intermediate spokes, or in various other patterns, provided the requirement is satisfied that the wire overlies the upper surfaces of the spokes as well as the bottom surfaces of the spokes.

Figure 19:
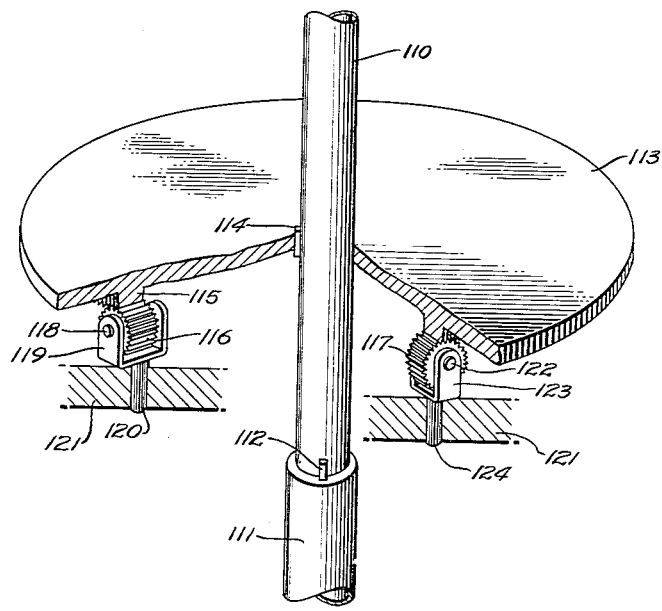
Fig. 19 is a perspective view, partly in section, of a modification of the means for obtaining a reciprocatory movement of the driving shaft of a magazine.

It will also be obvious that instead of employing guide pulleys which move up and down, the wire magazines themselves can be caused to move up and down. According to Fig. 19, the driving shaft of a wire magazine is composed of two telescoped sections 110 and 111. A wedge 112 is fitted between the two sections, to prevent a relative rotation of the two sections. Section 110 supports a disc 113 secured thereto by a wedge 114. The bottom surface of disc 113 is formed with a conical gear ring 115. This ring 115 is in mesh with three conical gears mounted on a disc 121 at equal distances from each other, two of the three conical gears designated 116 and 117 are shown on Fig. 19. Gears 116 and 117 are secured to eccentric studs 118 and 122, respectively rotatably mounted in brackets 119 and 123, respectively. These brackets are rotatably supported by means of pins 120 and 124, respectively, in said disc 121. Upon rotation of driving shaft 110—111, shaft section 110 will move up and down in an axial direction owing to the eccentrically mounted gears 116, 117.

The wire magazine may be placed on disc 113, which then should have such a small diameter relative to the wire magazine that the spokes of the magazine protrude from disc 113, or the magazine may be mounted on the free end of shaft section 110.

It will further be evident that instead of jointly driving the two shafts of the wire recorder of Fig. 1, the shafts may be driven separately by one motor or a separate motor may be provided for each shaft.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A method of winding recording wire upon and unwinding from a rotatable wire magazine of a wire recorder, comprising the steps of providing a generally planar wire magazine having a plurality of radially disposed and circumferentially spaced wire support means and two rotary drive means, one arranged to receive the radially inner ends of the support means in driving relationship and the other to receive the radially outer ends of the support means in driving relationship, placing the magazine upon said one support means, winding upon said support means, progressing from the radially inner end of the support means toward the radially outer end thereof, at least one plane layer of wire substantially perpendicular to the rotational axis of the magazine in which layer the individual wire turns are guided in a spacial relationship such that each turn of wire crosses the radially next preceding turn and the radially next succeeding turn at an angle and that the said crossings are circumferentially spaced by substantially equal intervals, transferring the loaded magazine to said other driving means, and unwinding the wire, progressing from the radially inner end of the support means toward the outer end thereof.

2. A wire recorder for winding recording wire upon and unwinding from a magazine, said recorder comprising a generally planar wire magazine including a plurality of radially disposed and circumferentially spaced wire support means, two rotary drive means for said magazine to rotate the same in the radial plane of the support means, one of said drive means having mounting means for receiving the radially inner ends of the support means, said drive means constituting the wind-up drive means, and the other having mounting means for receiving the radial outer ends of the support means, said latter drive means constituting the unwinding drive means, and wire guide means for feeding recording wire to the inner ends of the support means when the same are placed upon the wind-up drive means, the said guide means being mounted for reciprocation perpendicularly relative to the radial plane of the support means and operatively coupled with the support means for control of the said perpendicular movements by a rotation of the support means, the said guide means being disposed in a spacial relationship to the support means and the movements of the guide means being timed relative to the rotation of the support means such that the guide means alternately guide the wire through the radial spacings between the support means to the upper side and the lower side of successive support means whereby a layer of wire progressing radially outwardly is formed in which each individual wire turn crosses the radially next preceding and the radially next succeeding turn at an angle.

3. A wire recorder according to claim 2, wherein the said support means are uniformly distributed in circumferential direction whereby the said crossing of the wire turns are substantially equally spaced.

4. A wire recorder according to claim 2, wherein the wind-up drive means comprise a driving shaft and the mounting means thereon, a flanged substantially hub-shaped member releasably mountable on the driving shaft, and wherein the support means of the magazine comprise a plurality of spoke elements attachable with their inner ends to said hub member radially extending therefrom.

5. A wire recorder according to claim 4, wherein said magazine further comprises a plurality of peripherally spaced clamping means, each of said clamping means being engageable with one of said spoke elements for releasably clamping the said spoke elements to said hub member.

6. A wire recorder according to claim 5, wherein said wire support further comprises a second flanged substantially hub-shaped member mounted for a limited rotation relative to the first hub member coaxially therewith, and wherein said clamping means are secured to the second hub member and positioned to engage said spoke elements in one relative position of the two hub members and to release the same from the second hub member in another relative position of the hub members.

7. A wire recorder according to claim 2, wherein said support means are in form of plates radially extending in said radial plane from the center axis of the magazine and circumferentially spaced to form a radially extending slot between each two plates.

8. A wire recorder according to claim 2, wherein said unwinding drive means comprise a driving shaft and the mounting means of the said drive means comprise a substantially ring shaped support member mountable for rotation by said shaft and a plurality of peripherally spaced holding means on said ring-shaped support member, each of said holding means being arranged to receive and hold the outer end of one of said wire support means for supporting the said support means in positions radiating from said shaft.

9. A wire recorder according to claim 8, wherein the said support member comprises two ring-shaped elements coaxially disposed one above the other, and wherein the said holding means comprise a plurality of circumferentially spaced open recesses and grooves in one of the ring elements radially extending from the inner circumference of the respective ring element, each of said grooves being disposed circumferentially adjacent to the recesses of the side of the respective ring element facing the other ring element whereby, upon insertion of a wire support means in one of said recesses and a relative rotation of the ring elements into a position in which the portion of the grooved ring element forming the bottom of the respective groove overlies the inserted wire support means, the said wire support means is releasably retained in the ring shaped support member.

10. A wire recorder according to claim 2, wherein said wire support means are in form of bars, and wherein said mounting means on the wind-up drive means comprise clamping means releasably retaining the inner ends of said bars on the mounting means in a radially oriented arrangement, the said guide means guiding the wire to be wound upon said bars alternately over and below successive bars.

11. A wire recorder according to claim 10, in combination with wire transfer means coacting with the mounting means on the wind-up drive means for transferring from said mounting means, the said wire support means and recording wire wound thereupon as a package, said transfer means including release means engageable with said clamping means for moving the latter into a release position and gripping means engageable with said wire support means for removing the latter from the mounting means upon release of said clamping means.

12. A wire recorder according to claim 11, wherein said gripping means of the transfer means comprise a plurality of levers, one for each wire support means, pivotally mounted on said release means, the said levers being biased into a position disengaged from the wire support means and movable into supporting engagement with the same.

13. A wire recorder according to claim 12, in combination with an actuating member mounted on the release means movable relative thereto, the said actuating member engaging in one position said clamping means for effecting a release of the wire support means and in another position engaging said levers for pivoting the same into the position supporting the wire support means.

14. A wire recorder according to claim 2, wherein said guide means comprise cam means mounted for rotation in unison with the wire support means, a guide pulley, and means supporting the pulley displaceably perpendicular relative to the radial plane of the wire support means, the said cam means coacting with the pulley support means so as to impart to the pulley said reciprocatory motion timed relative to said wire support means for the purpose aforesaid.

15. A wire recorder according to claim 14, wherein said rotary wind-up drive means are operatively coupled with said cam means for rotating the latter.

16. A wire recorder according to claim 15 wherein said pulley support means comprise a verticle shaft mounted for rotation and axial displacement, one end of said shaft supporting said guide pulley and the other said cam means.

References Cited in the file of this patent

UNITED STATES PATENTS

| | | |
|---|---|---|
| 1,414,679 | Turney | May 2, 1922 |
| 1,539,224 | Way | May 26, 1925 |
| 2,574,883 | Medal | Nov. 13, 1951 |
| 2,632,059 | Camras | Mar. 17, 1953 |